Jan. 5, 1954     R. G. FERRIS     2,664,856
SALT CONTAINER
Filed Dec. 28, 1949     2 Sheets-Sheet 1
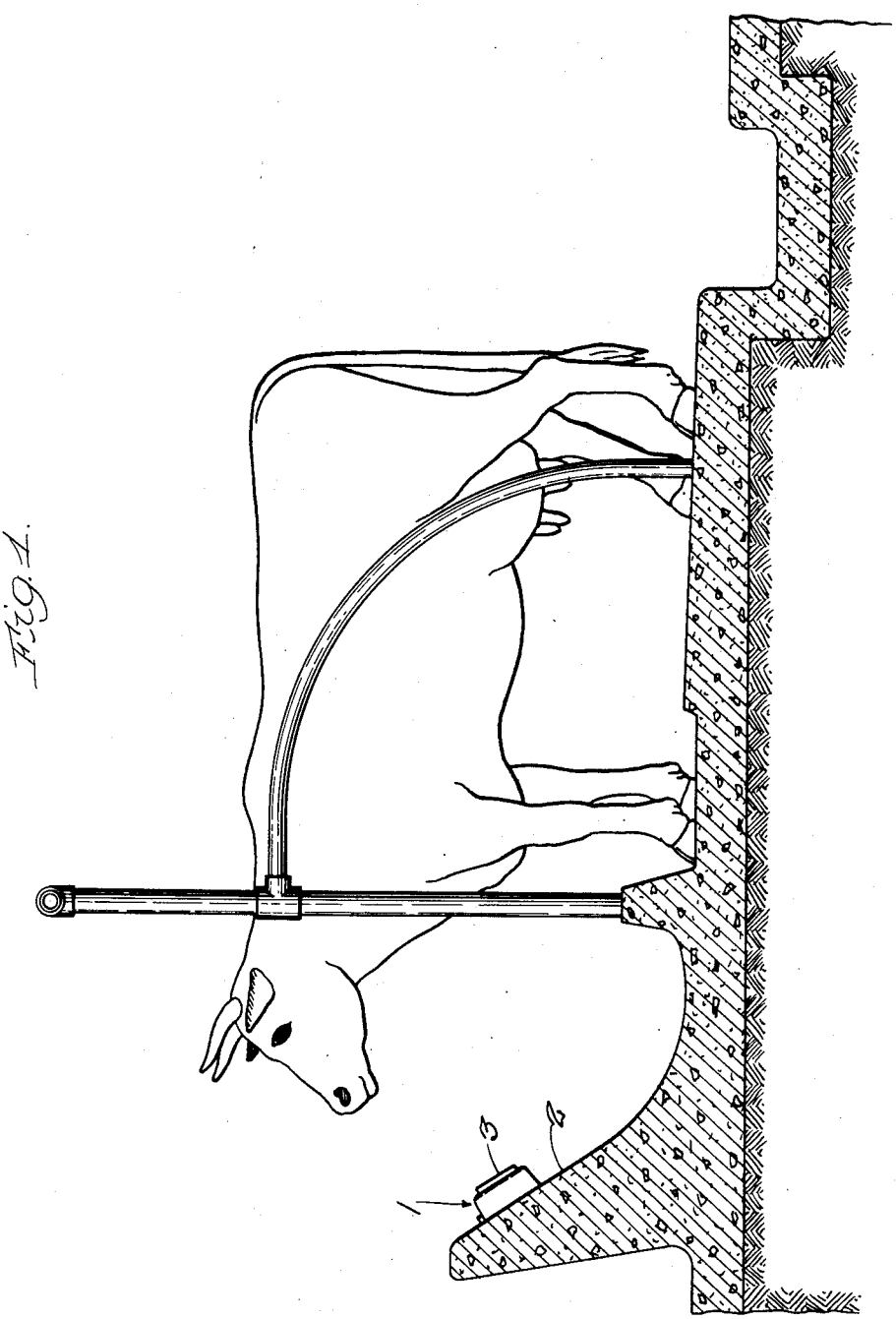

Jan. 5, 1954
R. G. FERRIS
2,664,856
SALT CONTAINER
Filed Dec. 28, 1949
2 Sheets-Sheet 2
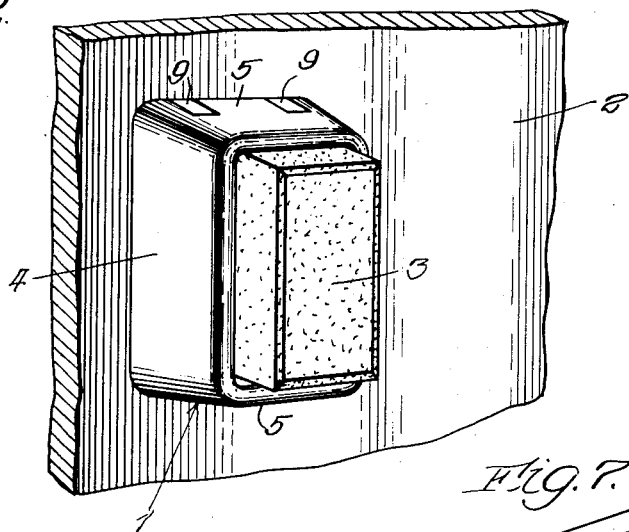
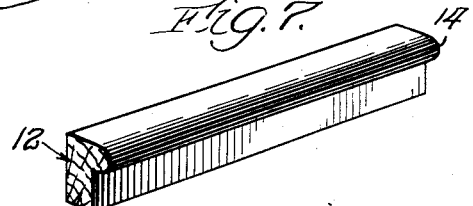
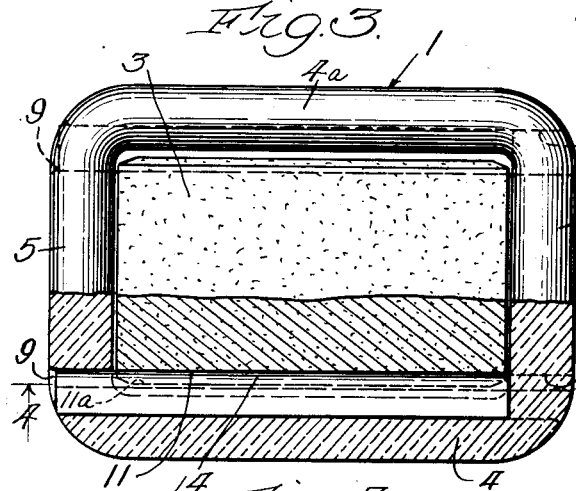
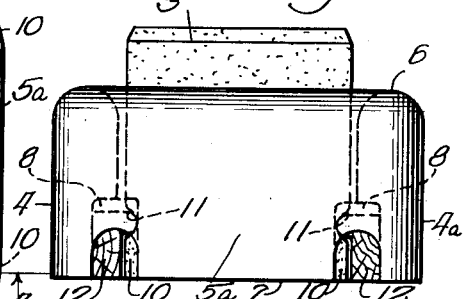
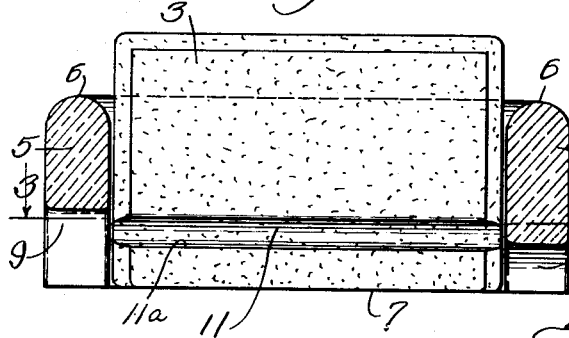
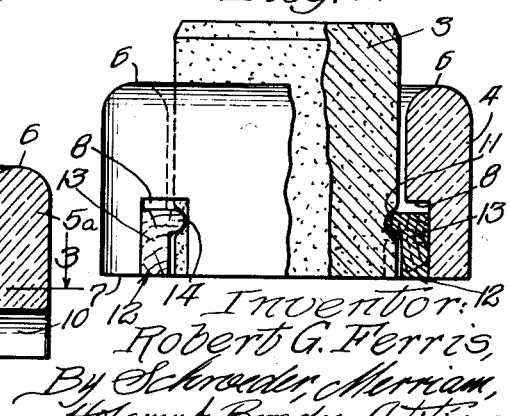
Inventor:
Robert G. Ferris,
By Schroeder, Merriam,
Hofgren & Brady, Attys.

Patented Jan. 5, 1954

2,664,856

UNITED STATES PATENT OFFICE 2,664,856

SALT CONTAINER

Robert G. Ferris, Harvard, Ill., assignor to Starline Inc., a corporation of Illinois Application December 28, 1949, Serial No. 135,322

5 Claims. (Cl. 119—51)

This invention relates to a container for salt and more particularly to such a container for use in dairy barns.

The usual dairy barn has a milking platform separated by metal supports into a group of stalls placing the cows in the proper positions for milking. Each stall has a stanchion mounted in a metal frame and the cow is held in the proper position by the stanchion. It has been found in the practice of dairy husbandry that a cow gives down her milk more readily if she is provided with food, water and salt at the time she is being milked. Most dairy barns therefore provide a shallow concrete or wood manger in front of the stalls in which hay can be placed for the cow to munch on and a water bucket or bowl is generally attached to the frame of the stall to provide water for the cow. Salt is also provided by placing a container such as a cup or bowl attached either to the frame of the stall or the water bucket. Insofar as I am aware, the salt container has always been attached to the metal parts of the stall, thus presenting a serious corrosion problem, because as the cow licks the salt she adds moisture thereto which forms a brine highly corrosive to metal. When the cow licks the salt she inevitably spills brine upon the metal posts and frame of the stall, thus corroding these parts. Salt cups or bowls fastened to the water bucket or the frame of the stall are very difficult to cleanse and to keep clean.

The container of the present invention is preferably a substantially rectangular upright ceramic frame member having glazed surfaces and is adapted to be cemented or otherwise mounted upon a surface of the building in front of the cow milking stalls. The preferred mounting position is upon the far sloping surface of the manger, although the container may be affixed to a horizontal or an upright surface if more convenient. In the preferred position, the container presents no impediment or obstruction to the cleaning of the manger. The brine which forms when the cow licks the salt is permitted to pass through drainage slots in the container and flow into the bottom of the shallow feed manger, where it may be easily swept up and removed with the old feed. The container bonded onto the manger locates the salt within easy reach of the cow; but it is so far removed from any metal stall members that the corrosion hazard is obviated.

In many of the big dairy areas the cattle must be housed in the barn for many months of the year, and during these months they live right in the milking stalls. The matter of cleanliness is therefore of great importance, both from the viewpoint of pure milk production and from the viewpoint of maintaining the health of the cattle. Corroded metal surfaces are very difficult to keep clean, and thus elimination of corrosion is a factor of prime importance.

The invention will be described with reference to the accompanying drawings, in which:

Fig. 1 is a side elevation of a cow stall with the manger and floor in section, showing the container and salt block mounted on the sloping surface of the manger;

Fig. 2 is an enlarged perspective view of the container and salt block mounted on a perpendicular surface of a barn;

Fig. 3 is a plan view of the container with the container partially in section as along line 3—3 in Fig. 4;

Fig. 4 is a sectional view taken along line 4—4 in Fig. 3;

Fig. 5 is an end elevation looking toward the lower end of the container as seen in Fig. 1;

Fig. 6 is an end elevation looking toward the upper end of the container as seen in Fig. 1, partially broken away to show the structure of a side wall; and Fig. 7 is a perspective view of a key member comprising part of the device.

As best seen in Fig. 1, the container 1 is mounted on the sloping surface 2 of a feeding manger in front of the cow-milking stalls in a dairy barn. A block of salt 3 is held in the container so that the cow may easily lick the salt while standing in the stall.

The container comprises a substantially rectangular upright frame member consisting of side walls 4 and 4a and end walls 5 and 5a defining an enclosure open both at the top and bottom. The walls may be made of non-corrosive metal, wood, plastic, molded concrete or other material; but are preferably made of ceramic material which is glazed so as to have an impervious surface. The upper surfaces 6 of the walls are rounded so as to present a smooth surface to the cow. The bottom surfaces 7 of the walls all lie in a plane which is substantially perpendicular to the walls, and form the base of the container. When the container frame is made of ceramic material all exposed surfaces are glazed to present a corrosion resistant surface and the bottom surfaces 7 of the walls are left unglazed so as to be easily bonded to the surface of the manger with a suitable bonding material which is preferably water, acid and salt proof.

As best seen in Fig. 6 the inner faces of the sides walls 4 and 4a are offset inwardly to form undercut recesses or grooves 8 which preferably extend to the bottom of the side walls and are alined with generally coextensive openings 9 which extend from the outer face to the inner face of the end wall 5. As best seen in Fig. 5 the opposite end wall 5a has small drainage slots 10 which may be located anywhere in said wall but which for ease of manufacture are preferably alined with the recesses 8. The slots 10 are of smaller cross-section than the recesses 8 so as to provide abutments partly closing said recesses. The brine which forms when the cow licks the salt flows into the container frame and escapes through the drainage slots 10; and when the device is mounted on a sloping surface of the manger, as shown in Fig. 1, the drainage is by gravity.

The container is proportioned to accommodate a commercially available four pound salt block 3, which is manufactured with a longitudinal groove 11 along each side. A pair of generally L-shaped key members 12 of wood, porcelain, non-corrosive metal or other suitable material having upright bases 13 and flanges 14 and are of suitable dimensions to be inserted through the openings 9 and into the recesses 8 with the flanges 14 engaging the grooves 11 in the salt block. The key members lock the salt block in position in the container frame by bearing against the top walls of the recesses 8 and engaging the grooves 11 so that their flanges 14 overlie the lower portions of said grooves which thus serve as interlocking shoulders 11a. Thus, the cow cannot dislodge the salt block from the container and permit it to drop into the feed in the manger. Obviously if the container is mounted in a substantially horizontal position these key members 12 need not be used.

A salt block which does not have a longitudinal groove along its side may be used in the container by employing a wedge member having a sharpened or pointed protrusion, which wedge member may be driven into its proper position with the protrusion biting into the salt block to lock it within the container.

If it is desired, loose salt may be placed in the retaining frame and after the cow has partaken of some of the salt it will become caked because of the brine formed. The salt will then mold itself about the protrusion of the wedge member and be locked in the container in the same manner as a block of salt.

The term non-corrosive is used herein to mean a material which is not deleteriously affected by a saturated solution of sodium chloride.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A cast container of non-corrosive material which has a roughened base adapted to be secured adjacent a cow stall and to receive a salt block which has one of its upright faces provided with a shoulder, comprising: continuous upstanding end walls and side walls forming a rectangular frame, there being an opening at the base of an end wall adjacent a side wall which extends from the outer to the inner face of said end wall, a continuous undercut groove in said side wall aligned with a portion of said opening, and a drainage slot in the other end wall aligned with a portion of said opening; and a removable key member which may be inserted through said opening and extend beneath said undercut groove, said key member having a lateral projection at its top adapted to overlie the shoulder in a salt block in said frame.

2. The container of claim 1 in which the frame has a flat bottom for attachment to a planar, non-horizontal surface with the drainage slot at the lowermost part of the frame, the container has an open bottom so that the salt block rests on said surface, and the opening, undercut, and drainage slot all form recesses in the flat bottom of the frame.

3. A container having a roughened base adapted to be secured adjacent a cow stall, said container being adapted to receive a salt block which has one of its upright faces provided with a shoulder, comprising: a frame member having a continuous upstanding wall with outer and inner faces which has an opening from its outer to its inner face adjacent its base, a portion of the inner face of said wall having an undercut groove parallel to the base which merges into said opening; and a removable key member in said opening and having a portion extending into said undercut groove, said key member having a portion which is adapted to overlie the shoulder in a salt block in said frame.

4. The container of claim 3 in which the frame member has end wall portions and side wall portions so that it is rectangular, the opening is in an end wall portion, and the undercut groove extends continuously along a side wall portion.

5. The container of claim 3 in which the continuous wall has a flat bottom for attachment to a planar, non-horizontal surface, the container has an open bottom so that the salt block rests on said surface, and a drainage slot is provided in the base of the wall substantially opposite the opening for the key member.

ROBERT G. FERRIS.

References Cited in the file of this patent

UNITED STATES PATENTS

| Number | Name | Date |
| --- | --- | --- |
| 485,328 | Lee | Nov. 1, 1892 |
| 711,170 | Michelson | Oct. 14, 1902 |
| 739,514 | Street | Sept. 22, 1903 |
| 1,267,353 | Baker | May 28, 1918 |
| 1,463,775 | Goldsmith | July 31, 1923 |
| 1,485,753 | Zundel | Mar. 4, 1924 |
| 1,635,811 | Blake et al. | July 12, 1927 |
| 1,876,828 | Ashfield | Sept. 13, 1932 |
| 2,288,637 | Mauro | July 7, 1942 |
| 2,310,200 | Callis | Feb. 9, 1943 |

FOREIGN PATENTS

| Number | Country | Date |
| --- | --- | --- |
| 16,307 | Great Britain | 1905 |
| 110,392 | Great Britain | Oct. 17, 1917 |